E. W. BOYDEN

June 2, 1931. METHOD AND MEANS FOR WAVING HAIR Re. 18,088

Original Filed July 28, 1926

INVENTOR
Elias Milbry Boyden
BY
Carl H. Crawford
ATTORNEY

Reissued June 2, 1931 Re. 18,088

UNITED STATES PATENT OFFICE

ELIAS WHITNEY BOYDEN, OF SPOKANE, WASHINGTON

METHOD AND MEANS FOR WAVING HAIR

Original No. 1,671,177, dated May 29, 1928, Serial No. 125,466, filed July 28, 1926. Renewed April 4, 1928. Application for reissue filed December 17, 1929. Serial No. 414,833.

The object of this invention is to provide a novel method and means for temporarily waving human hair.

In permanent waving, the hair is first tightly twisted, into a long roll, and then the twisted roll is spirally wound about a heater of a rod-like contour and of small diameter. The heat applied, is of such a high temperature as to steam the tightly rolled and spirally wound hair. In order to make the wave permanent, the hair is frequently "jelled" by the combined pressure of twist and wind, in addition to the extreme temperature to which it is subjected, and when the hair is released, its structure has been changed in order to effect the permanency required and expected. The hair is not moistened with water but with various oily materials that coact with the heat and the abnormal twist and roll of the hair with a view of causing the hair to permanently assume the false form desired.

In marcelling the hair, the latter is likewise subjected to a very high temperature, on a curling iron, such as would produce steam, and the result is that gray or white hair is most always discolored, either in permanent waving or marcelling, and the naturally colored hair is burned and permanently injured.

The object of this method and apparatus is not to permanently wave the hair, but to temporarily cause the latter to assume a wavy form. Hence, it is a feature of this invention to only subject the hair to a low temperature, which is primarily, a drying out temperature, and not in any sense a steam producing temperature.

In accordance with my novel method and apparatus, a lock of hair is rolled, untwisted, into a series of superimposed convolutions, into a single roll of hair, the latter having been previously moistened with water, and then the rolled hair is subjected to heat only sufficient to vaporize off the moisture.

It is a feature of my invention to roll the hair in such a manner as to cause the same to spread thereby greatly facilitating the application of heat thereto, and in the most preferred form, the heat is applied internally of the rolled hair; the exterior being exposed for natural drying or for the application thereto of a gently drying heat such as a thermos lamp.

It is a further object of the invention to devise improved hair waving apparatus utilizing electrical heating means.

In the most improved form of my invention, the drier is of such a relatively enlarged diameter with respect to the heating sticks used in permanent waving and marcelling or hair curling irons, that the roll of hair is materially enlarged with respect to these other forms of treatment.

A further feature consists in making the drier of a heat retaining substance such as earthenware or porcelain, the feature consisting of a drier that will be slow to heat and will correspondingly retain the heat imparted thereto. Thus, the drying of the hair, in accordance with my invention, is performed by the gentle stored-up heat that naturally radiates off from my improved drier.

My invention has other features and objects which will be more fully described in connection with the accompanying drawings, and which will be more particularly pointed out in and by the appended claims.

Like characters of reference designate similar parts throughout the different figures of the drawings.

Figure 1:
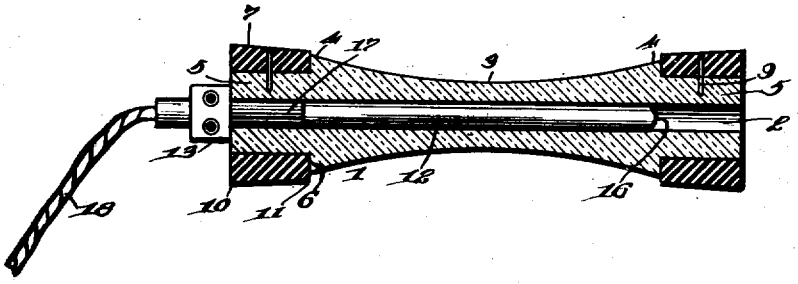
Fig. 1 is a sectional view of my improved drier showing the heating stick applied thereto.
Figure 2:
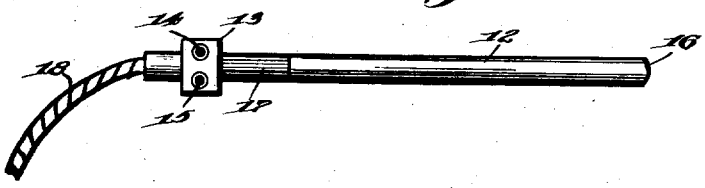
Fig. 2 is a view of the heating stick withdrawn from the drier.

First describing my improved drier, the same, it may be stated, is shown in full or actual size, and is indicated generally at 1. The drier or spindle is generally tubular in form, the same having a bore 2, open at both ends. The central or hair rolling or receiving portion of the drier has a longitudinally concave periphery, the smallest diameter being indicated at 3, and the largest or maximum diameter at 4, near the ends thereof. The drier, as shown, terminates in hubs 5, the diameters of which are reduced with respect to the maximum diameter 4, thereby forming shoulders 6. I prefer to make that portion of the drier thus far described, of a material of low heat conductivity and of a material adapted to very slowly release the heat once imparted thereto. An earthen or porcelain material meets my requirements in this respect.

In order to protect the head of the subject from contact with any heated portion of the drier, however mild, I will next describe a means herein shown for that purpose.

On the hubs 5, I apply collar guards 7, preferably of heat insulating material such as fiber or rubber. These guards 7, have cylindrical bore 8, adapted to fit snugly onto the hubs 5, and the guards may be secured by means such as pins 9. Aside from the broad feature of heat insulating guards mounted upon a hair drier, I claim it a feature of novelty to cone the collar guards so that the largest external diameter will be outwardly disposed, as at 10, while the lesser diameter will be at the inner portions of the guards, as indicated at 11. This feature is also enhanced by so proportioning the guards that the lesser diametrical portions 11, will project slightly from the major diameter 4, of the heater, thereby never permitting the heater to actually come into contact with the head of the subject. It is a further feature to cone or slope the guards inwardly in general accordance with the inwardly sloping concavity of the drier so that while the collars serve to prevent the drier from actually coming into contact with the head of the subject, they will never-the-less permit the drier to come into such close proximity to the head as to roll the hair onto the drier very close to the roots, or to the head of the subject, as clearly shown in Fig. 4.

I will next describe my improved heating stick which serves to impart and store up heat in the drier.

My improved heater stick is indicated at 12, and may be made up of any suitable material affording a high coefficient of heat conductivity and be wired in a manner within the skill of an electrician, to provide a proper source of electric heat. The heater is provided with an enlarged portion 13, which may contain suitable circuit closers in the form of minute buttons 14 and 15, for turning the current on and off. This enlargement or switch box 13, also forms a stop or shoulder, which functions to prevent the heater from being inserted into the drier beyond a predetermined extent, as shown in Fig. 1. In practice, I prefer to provide a stick wherein all heat radiation will be confined to that portion of the drier between the guards 7. Thus, the length of the heater is such that when the box 13, engages one end of the drier, the end 16, of the stick will be approximately on a line with the inside edge of the remote collar guard 7. I also provide the stick 12, with a nonheat conducting portion 17, approximately of a length equal to the width of one collar 7, so that heat will be generated to the drier between the collar guards, where the heat is needed, and what heat flows to the ends of the drier will not raise the latter to the same temperature as the central or hair winding peripheral portion of the drier.

Further, I consider it a feature to merely have the heater stick 12, fit snugly in the bore 2, and be insertable therein from either end of the drier thereby facilitating the operation of forming a water wave with right or left handed users, and irrespective of any lateral obstructions.

I have shown the heater stick connected with an electric cord 18, adapted to be provided with a suitable plug or like connection for attachment to a suitable source of current, not shown.

I will next describe the preferred manner in which the hair is treated, in accordance with my invention.

Figure 4:
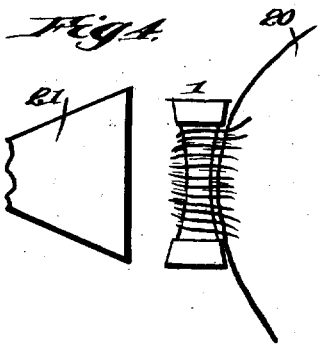
Fig. 4 is a top plan view of the rear portion of a head showing the drier in a rolled-up position and illustrating the manner in which a thermos or like shaded electric lamp may be employed to assist in drying out the roll of hair.
Figure 5:
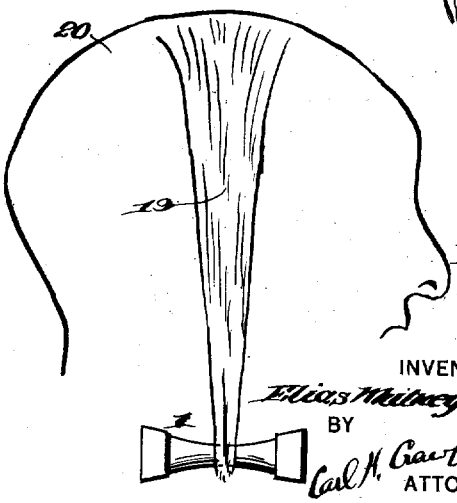
Fig. 5 is a side view of a head showing the manner in which the drier is employed in rolling up a lock of hair.

With the heating stick removed, one of the heaters 1, is selected by the operator and a segregated lock of hair 19, is grasped, and beginning with the tip ends, the hair is rolled up on the drier 1, until the drier reaches the head 20, as shown in Fig. 4. Now it will be seen that the lock of hair 19, is not twisted, but is entirely straight, and only enough tension is applied to afford a smooth roll of hair. It will also be noted that the tip ends of the hair lock 19, are started near the center 3, which is of the smallest diameter, and that consequently, as the roll increases, the hair is free to spread on the longitudinally concave periphery of the drier. By means of this construction, I obtain a more uniform contact of the hair with the periphery of the drier than would be the case if the drier were cylindrical in form. Further, it will be noted that as the roll of hair is being formed, which has previously been sufficiently moistened with water, the lock is rolled up in superimposed convolutions into one integral roll.

It will also be noted that after the roll is formed, it is thicker near the center than near the edges, and consequently the thinner cross section of the drier at 3, affords a quicker heating action than the thicker portions near the ends 4, where the thickness of the hair roll decreases.

After the hair has been rolled, as shown in Fig. 4, or after all the locks of hair have been rolled, each drier is suitably secured by a comb or hair pin, in a manner well known to skilled operators.

One heater stick may serve for one head or subject, but more can be provided if necessary. A stick 12, will be inserted into the driers when the latter are in the position shown in Fig. 4. The stick will be left in the drier 1, just long enough for the latter to absorb enough heat to vaporize off the moisture previously imparted to the hair. Such a heat would not be so great but what the drier could be held by the fingers of the hand, and would be below the boiling point of water. As soon as the drier had absorbed the required amount of heat, the stick 12, would be withdrawn, and inserted in another drier, and so on, successively until all the driers on the head of the subject had been heated.

It will be noted that by this improved method, the heat will never in any event be too intense as the operator can readily judge by the fingers when the heat is sufficient.

Now by reason of the fact that the driers are made of a material that releases the heat slowly, such as porcelain, the moisture in the roll of hair will be quickly but very gently dissipated or vaporized off as the stored up heat radiates off from the drier. The heat is thus applied to the interior of the hair roll and radiates off radially outwardly through the roll of hair. Should it be found desirable or necessary, and this is a feature of the invention, a thermos lamp, or any ordinary electric lamp having a shade 21, which serves to localize its gentle rays of heat, may be applied as shown in Fig. 4, to subject the exterior of the hair roll to a drying heat. Thus externally and internally, the hair roll is heated, and the hair on the drier is completely exposed so that the drying action will thereby be facilitated. Because of the fact that the hair is dried out by the radiation of stored heat, and is not subjected to the action of a directly heated body, the hair is never discolored, and its initial structure is not changed, as in the case of direct heat application. By means of the joint application of heat both externally and internally, the operation of drying is hastened and made thorough, although it is within the province of my invention to omit the external heat.

Figure 6:
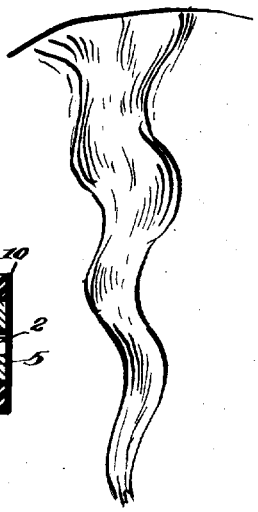
Fig. 6 is a view of a lock of hair after the water wave has been imparted thereto.
Figure 3:
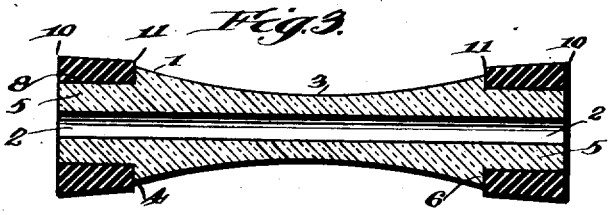
Fig. 3 is a sectional view of the drier with the heating stick withdrawn therefrom.

After the hair rolls have been dried out, the combs or other attaching or holding means are withdrawn and the driers 1 are unrolled until the hair tips of the locks are freed. Then the hair is shifted by the fingers of the operator reversely and transversely of the longitudinal axis of the lock in order to produce the sinuous form known as the water wave, as shown in Fig. 6.

It is believed that my invention will be clearly understood from the foregoing description and I do not wish to be limited thereto except for such limiations as the claims may impart.

I claim:

1. A method of preparing the hair for water waving human hair, which consists, in winding a water moistened lock of untwisted hair in superimposed convolutions into a roll with the exterior of the roll exposed, in vaporizing off the moisture while the hair is rolled under low heat, and in unrolling the lock and shifting the hairs thereof alternately and reversely of the longitudinal axis of the lock to form the latter into a sinuous wave.

2. A method of preparing the hair for water waving human hair, which consists, in winding a lock of water moistened-hair beginning with the end tips and winding close to the head with the convolutions in superimposed relation and forming a single roll, in vaporizing off the moisture from the interior of the hair roll outwardly under low heat, in un-winding the rolled lock, and in reversely and laterally shifting the hair lock to form the same into a sinuous wave.

3. The sub-combination of the herein-described method which comprises preparation of the hair to be waved, which consists, in winding a tapered lock of water moistened hair from the tip end toward the roots into a roll of convolutions with the hair gently tensioned, in causing the gently tensioned hair to spread as the same is being rolled to facilitate drying the same, and in applying a low vaporizing drying heat to the spread roll of hair to vaporize off the moisture.

4. The sub-combination of the herein-described method which comprises preparation of the hair to be waved, consisting, in winding a tapered lock of liquid moistened hair about a transversely circular and longitudinally concave surface thereby causing the hair to spread laterally of the lock as it is being wound into a roll, and the hair being under a gentle tension, and in applying a gentle vaporizing heat to the interior of the roll to dry the latter.

5. A method of water waving human hair, which consists, in losely winding a lock of liquid moistened un-twisted hair from the tip end toward the roots into a roll of superimposed convolutions with the hair gently tensioned, in causing the gently tensioned hair to spread as it is being wound into a roll, to facilitate drying the same, in applying a gentle vaporizing heat to the interior of the roll to dry the same, in unwinding the roll, and in reversely shifting the lock to form the latter into a sinuous wave.

6. The herein-described device for water waving hair, comprising, a generally tubular drier having a hair winding periphery longitudinally concave from its ends toward its center and terminating in reduced guard supporting hubs, collar guards mounted on said hubs and formed of material of low heat conductivity, said guards being externally coned to peripherally slope toward the center of said drier and the most reduced diametrical portions of said guards having a diameter greater than the greatest diameter of said drier.

7. The herein-described device for water waving hair, comprising, a generally tubular drier having a bore therethrough and provided on its ends with heat insulating collar guards, a stick heater adapted for insertion into the bore of said drier, said heater having an enlargement limiting insertion of said heater to dispose the free end thereof substantially at the inner edge of the collar guard adjacent thereto, that portion of said heater adjacent said enlargement being insulated against heat radiation for a distance equal to the length of that collar guard adjacent thereto, whereby said heater will directly increase the temperature of said drier only between said collar guards.

8. A hair waving device comprising a generally tubular drier having a bore therethrough and provided on its ends with heat insulating collar guards, a stick heater adapted for insertion in the bore of said drier, said heater having an enlargement limiting insertion of said heater to dispose the free end thereof substantially at the inner edge of the collar guard adjacent thereto.

In testimony whereof, I have hereunto set my hand.

ELIAS WHITNEY BOYDEN.